Patented Dec. 20, 1949

2,491,471

UNITED STATES PATENT OFFICE 2,491,471

ACRYLONITRILE-VINYLPYRIDINE COPOLYMERS

Harold Wilfred Arnold, Claymont, Del., assignor to E. I. du Pont de Nemours & Company, Wilmington, Del., a corporation of Delaware No Drawing. Application February 25, 1948, Serial No. 10,910

4 Claims. (Cl. 260—85.5)

This invention relates to acrylonitrile polymers and more particularly to copolymers of acrylonitrile with vinylpyridines.

This application is in part a continuation of my copending application Serial No. 548,782, filed August 9, 1944, now U. S. Patent 2,456,360.

Polyacrylonitrile is a relatively high-softening polymer. Filamentary products obtained by spinning a solution such as a dimethylformamide solution give fibers which, after orientation, are strong and insensitive to water and common organic solvents such as those used in the dry-cleaning industry. Although the general inertness of the polyacrylonitrile and filamentary products derived therefrom is advantageous in most instances it is a disadvantage when colored products are desired. A polymeric acrylonitrile oriented yarn that would be readily susceptible to conventional dyeing, e. g., with acid dyestuffs, would be particularly valuable.

This invention has as an object the preparation of an oriented acrylonitrile polymer readily susceptible of being dyed with conventional dyes. Another object is the preparation of acrylonitrile polymers capable of furnishing oriented filaments of high tensile strength and capable of being dyed. Other objects will appear hereinafter.

These objects are accomplished by the invention of oriented polymeric material dyeable with acid dyes consisting of a copolymer of acrylonitrile with a vinylpyridine and of the process for preparing the same.

These acrylonitrile/vinylpyridine copolymer compositions may be prepared by several different techniques, e. g., in solution, bulk, granular, or emulsion systems, with a free-radical-producing catalyst such as a peroxygen or azo catalyst.

The following examples in which parts are by weight are illustrative of the invention.

Example I

To a solution of a pH of about 3, in a glass container, of 180 parts of water, 0.2 part ammonium persulfate, and 0.1 part sodium bisulfite were added 19 parts of acrylonitrile and one part of 2-vinylpyridine (the ratio of acrylonitrile to vinylpyridine being 95:5). The reactor was flushed with nitrogen, sealed, and heated with agitation for 24 hours. Unreacted monomer was removed by steaming the reaction mixture. The polymer was precipitated by the addition of a small amount of an aluminum sulfate solution. The polymer was washed with water and methanol and dried. There was obtained 13 parts of copolymer. The composition of the polymer was approximately 6% vinylpyridine–94% acrylonitrile. A portion of the copolymer was dissolved in dimethylformamide and a film cast from the solution. The film was stretched in boiling water at a ratio of about 10:1. Portions of the film were dyed with acid dyes (Bordeaux azo dye obtained by coupling benzidinine with one mol of 1-aminonaphthalene-4-sulfonic acid and one mol of 2-amino-8-hydroxynaphthalene-6-sulfonic acid and red azo dye obtained according to the method described in Example I of Gubelmann and Oesch U. S. 1,910,690), a chrome dye (Colour Index No. 431), and acetate dyes (1,4-diaminoanthraquinone and Colour Index 680). The films had considerable affinity for these dyestuffs. Controls from acrylonitrile homopolymers were not dyed to any substantial extent under the same conditions.

Example II

In a glass vessel equipped with a stirrer and condenser, and containing 15,000 parts of distilled water through which nitrogen had been bubbled, there were placed 3 parts of a sodium sulfate of an aliphatic hydrocarbon of about 15–18 carbons, 712.5 parts of acrylonitrile, 37.5 parts of 2-vinylpyridine, and 15 parts of alpha,-alpha'-azodiisobutyronitrile. The polymerizable monomers contained 95% of acrylonitrile and 5% of vinylpyridine. The vessel and contents were heated in a bath of 65–70° C. for 16½ hours. The polymer was coagulated by adding 200 parts of a water solution containing 10% of aluminum sulfate; the precipitate was filtered, washed with distilled water and acetone, and dried. There was obtained 579.2 parts of copolymer which contained 5% 2-vinylpyridine and 95% acrylonitrile and which had an approximate molecular weight of 78,000 as determined from the viscosity of a solution in dimethylformamide. Yarn was obtained from the copolymer by dry-spinning a dimethylformamide solution. The yarn had excellent dyeability with acid dyes, whereas an acrylonitrile polymer similarly prepared in the absence of vinylpyridine had poor dyeability with acid dyes.

Addition of two drops of concentrated sulfuric acid to 10 mols of an agitated 2% dimethylformamide solution of the polymer gave a temporary precipitate which quickly redissolved. A heavy permanent precipitate appears if small amounts of polyvinylpyridine homopolymer are present in the solution.

Example III

When the general procedure of Example II was repeated, except that the concentration of monomer in the aqueous polymerization medium was increased from 5% (as in Example II) to 7% and the time of polymerization decreased to 2 hours, there resulted an 85% yield of copolymer having a molecular weight of about 106,000. This copolymer contained about 5% 2-vinylpyridine and 95% acrylonitrile.

Example IV

In a glass vessel equipped with a stirrer and condenser and containing 10,000 parts of distilled water there were placed 2 parts of the sodium sulfate of an aliphatic hydrocarbon of about 15–18 carbons, 450 parts of acrylonitrile, 50 parts of 2-vinylpyridine (10% vinylpyridine based on the total polymerizable monomers) and 10 parts of alpha,alpha'-azodiisobutyronitrile. The mixture was agitated at 65° C. for 17 hours. The polymer was coagulated by adding 200 parts of a water solution containing 10% of aluminum sulfate. After filtering, washing, and drying the precipitate, there was obtained 248 parts of a polymer which had a molecular weight of 79,000 as determined from the viscosity of the solution in dimethylformamide. The yarn had excellent dyeability with acid dyes and the sulfuric acid test described in Example III indicated the absence of polyvinylpyridine homopolymer.

Example V

A mixture containing a total of 240 parts of distilled water, 17.55 parts of acrylonitrile, 0.45 part of 5-vinyl-2-methylpyridine (2.5 per cent based on total monomer), 0.09 part ammonium persulfate and 0.18 part sodium metabisulfite was adjusted to a pH of 4.6 by adding dilute sulfuric acid. The mixture was placed in a container. The container was sealed, agitated, and heated at 45° C. for 17 hours. There was obtained 68% yield of a copolymer having an average molecular weight of about 30,000. A film of this polymer, which was obtained by casting a dimethylformamide solution, was dyed when placed in a boiling aqueous bath containing an acid dyestuff (1,5 - diamino - 4,8 - dihydroxyanthraquinone-3-sulfonic acid).

The copolymerization may be carried out by conventional methods although aqueous systems, and particularly those containing 50–98% water, are preferred in view of the ease of polymerization and superiority of the copolymer obtained. In the copolymerization medium the vinylpyridine should be present to an extent of at least 2% of the acrylonitrile/vinylpyridine charge. The concentration of the vinylpyridine may be as high as 10%, particularly in aqueous systems with peroxygen catalyst, to give copolymers containing 2–10% combined vinylpyridine, although oriented polymers dyeable with acid dyes and of tensile strength adequate for filamentary products may be obtained when as low as 10% of a vinylpyridine or as high as 10–15% thereof is present in the copolymer. The minor amount of the vinylpyridine necessary depends on the particular vinylpyridine. Thus 2-methyl-5-vinylpyridine gives equivalent dyeing properties when used in half the amount of 2-vinylpyridine. Tensile strengths suitable for filamentary purposes require that the vinylpyridine be present in minor quantities, i. e., 15% or less. The polymerization may be initiated with catalysts which produce free radicals under the conditions employed, e. g., at temperatures generally within the range of 30–100° C. These initiators include peroxygen and azo catalysts. The peroxygen catalysts include benzoyl peroxide, lauroyl peroxide, and persulfuric acid salts such as ammonium or potassium per sulfate. Suitable azo catalysts are those which have an acyclic azo group bonded to different aliphatic or cycloaliphatic carbons, at least one of which is tertiary and has directly attached to it through carbon a radical in which the three remaining valences of the latter carbon are satisfied by at least one element of atomic number 7 to 8 (oxygen and/or nitrogen). These include alpha-carbamylazoisobutyronitrile, alpha,alpha' - azobis- (alpha,gamma - dimethylvaleronitrile), alpha,- alpha' - azobis(alpha - phenylpropionitrile), and alpha,alpha'-azobis(alpha - cyclopropylpropionitrile). Such azo catalysts are preferred in view of the ease of copolymerization and the superior homogeneity in the resulting copolymer.

The vinylpyridines that may be copolymerized with acrylonitrile include the 2-, 3-, and 4-vinylpyridines and the corresponding polymerizable vinylpyridines which may have hydrocarbon groups of preferably a total of not more than four carbons attached to the pyridine nucleus, i. e., preferably vinylpyridines having only carbon, hydrogen, and the one pyridine nitrogen. Examples of vinylpyridines that may be employed in the production of the copolymer of this invention include 5-ethyl-2-vinylpyridine, 4,6-dimethyl-2-vinylpyridine, 4-ethyl-2-vinylpyridine, 2-methyl-5-vinylpyridine, 6-methyl-2-vinylpyridine and 2- and 4-vinylquinolines. In view of its availability, 2-vinylpyridine is usually employed.

The copolymers of this invention are particularly useful in the preparation of fibers. Copolymers having from 2–10% of a vinylpyridine have the desirable strength and water resistance of polyacrylonitrile with good dye absorption properties, particularly for acid dyestuffs. Preferably, copolymers containing 2–10% of a vinylpyridine have the preferred combination of physical properties, particularly in the form of filaments.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A copolymer containing 2–10% recurring vinylpyridine units, the remainder of the copolymer consisting of acrylonitrile units.

2. A copolymer composed of acrylonitrile and 2–10% by weight of the copolymer of a vinylpyridine.

3. A shaped article having one dimension large relative to another of its dimensions, said article being composed of the copolymer of claim 1.

4. A shaped article according to claim 3 dyed with an acid dye.

HAROLD WILFRED ARNOLD.

REFERENCES CITED

The following references are of record in the file of this patent:

UNITED STATES PATENTS

| Number | Name | Date |
|---|---|---|
| 2,402,020 | Cislak et al. | June 11, 1946 |
| 2,448,542 | McQueen et al. | Sept. 7, 1948 |

FOREIGN PATENTS

| Number | Country | Date |
|---|---|---|
| 597,368 | Great Britain | Jan. 23, 1948 |